United States Patent [19]

Martin

[11] Patent Number: 4,541,906

[45] Date of Patent: Sep. 17, 1985

[54] ZINC ELECTROPLATING AND BATHS THEREFORE CONTAINING CARRIER BRIGHTENERS

[75] Inventor: Sylvia Martin, Utica, Mich.

[73] Assignee: OMI International Corporation, Warren, Mich.

[21] Appl. No.: 611,114

[22] Filed: May 21, 1984

[51] Int. Cl.[4] .............................................. C25D 3/22
[52] U.S. Cl. ................................................ 204/55 R
[58] Field of Search .................... 204/55 R, 44.2, 114, 204/123

[56] References Cited

U.S. PATENT DOCUMENTS 4,089,755   5/1978   Steinecker ........................ 204/55 R

*Primary Examiner*—G. L. Kaplan
*Attorney, Agent, or Firm*—Richard P. Mueller

[57] ABSTRACT

An improved aqueous acidic zinc electrolyte and process for electrodepositing zinc on a conductive substrate in which the electrolyte contains a brightening amount of a bath soluble anionic sulfated polyoxyalkylene surfactant derived from the sulfation of:

(a) the polymerization of alkylene oxides selected from the group consisting of ethylene oxide, propylene oxide, glycidol, butylene oxide and mixtures thereof; and (b) the alkoxylation of mono and polyhydroxy compounds having radicals selected from the group consisting of hydroxyl containing alkyl, alkenyl, alkynyl, aryl, and carboxylic derivatives thereof as well as mixtures thereof.

The zinc electrolyte can further contain conventional additives and agents of the types employed in acid zinc electrolytes to provide modifications and desired characteristics of the zinc electrodeposit.

19 Claims, No Drawings

ZINC ELECTROPLATING AND BATHS THEREFORE CONTAINING CARRIER BRIGHTENERS

BACKGROUND OF THE INVENTION

The present invention broadly relates to an improved electrolyte and process for electrodepositing zinc, and more particularly, to an improved non-cyanide acid zinc electrolyte containing improved carrier brightening agents.

A variety of aqueous cyanide-free acidic zinc electroplating solutions and processes have heretofore been used or proposed for use. In many instances, such acid zinc electrolytes contain polyalkoxylated nonionic surfactants as carrier brighteners in further combination with primary and supplemental brightening agents to achieve a zinc deposit of the desired characteristics. A continuing problem associated with the use of polyalkoxylated nonionic surfactants as carrier brighteners in prior art electrolytes has been the tendency of such electrolytes to reach a cloud point at relatively low bath temperatures, such as about 80° to about 100° F. This problem is further aggravated when the acid zinc electrolyte contains relatively high concentrations of soluble constituents, particularly dissolved metal ions of the periodic table of Group I and II metals as well as ammonium ions. The operation of the bath at relatively high current densities also contributes toward an increase in the temperature thereof further aggravating the tendency of such carrier brighteners to attain the cloud point. When the cloud point of the nonionic carrier brightener surfactant is attained, the carrier brightener is rendered inoperative and no longer contributes to a brightening effect of the zinc electrodeposit nor does it function secondarily as a surfactant to emulsify oils and other organic contaminants in the electroplating bath.

The present invention overcomes the problems and disadvantages associated with prior art acid zinc electroplating baths by employing an improved anionic surfactant carrier brightener having a substantially higher cloud poit which is compatible with other conventional primary and supplemental brighteners of the types conventionally employed achieving the same benefits as heretofore provided by nonionic carrier brighteners while at the same time substantially increasing the flexibility of operation of the bath to obtain zinc electrodeposits of the desired quality.

SUMMARY OF THE INVENTION

The benefits and advantages of the present invention in accordance with the composition aspects thereof are achieved by a cyanide-free aqueous acidic zinc electrolyte containing zinc ions in conventional amounts to effectively electrodeposit zinc on a conductive substrate, hydrogen ions present in an amount to provide a pH on the acid side, and a brightening amount of a bath-soluble anionic sulfated polyoxyalkylene surfactant derived from the sulfation of:

(a) the polymerization of alyklene oxides selected from the group consisting of ethylene oxide, propylene oxide, glycidol, butylene oxide and mixtures thereof; and (b) the alkoxylation of mono and polyhydroxy compounds having radicals selected from the group consisting of hydroxyl containing alkyl, alkenyl, alkynyl, aryl, and carboxylic derivatives thereof as well as mixtures thereof.

The aqueous acidic zinc electrolyte can additionally and, preferably, contain various other additive agents of the types conventionally employed including buffering agents, primary or supplemental brightening agents, bath soluble and compatible conductivity salts to increase the electrical conductivity of the electrolyte, and the like.

In accordance with the process aspects of the present invention a zinc plate is deposited on a conductive substrate employing the aforementioned aqueous acidic zinc electrolyte which is controlled at a temperature generally ranging from about 60° up to about 180° F. and which is operated at an average cathode current density ranging from as low as about 1 up to as high as about 300 amperes per square foot (ASF) or higher depending upon the specific type and composition of the electrolyte and the geometry and processing parameters employed in the plating operation.

Additional benefits and advantages of the present invention will become apparent upon a reading of the Description of the Preferred Embodiments taken in conjunction with the specific examples provided.

DESCRIPTION OF THE PREFERRED EMBODIMENTS

The aqueous acidic cyanide-free zine electrolyte in accordance with the composition aspects of the present invention contains zinc ions present in an amount effective to electrodeposit zinc from the electrolyte and generally can range from about 4 g/l up to saturation which will vary depending upon the operating bath temperatures of the electrolyte. For example, at electrolyte temperatures of about 100° F. and above, zinc ion concentrations of about 300 g/l and higher can be employed. Typically, in acid chloride-type electrolytes, the zinc ion concentration is conventionally controlled with a range of about 7 up to about 50 g/l whereas in acid sulfate-type electrolytes, the zinc ion concentration is generally controlled within a range of about 30 up to about 110 g/l.

The acid zinc electrolyte is formulated in accordance with conventional practice by introducing a zinc salt such as a chloride, sulfate, or sulfamate in an aqueous solution along with a noncomplexing acid such as hydrochloric acid, sulfuric acid or sulfamic acid. Mixtures of zinc salts, for example, zinc chloride and zinc sulfate, can be employed if desired providing a mixed-chloride type bath. Acid zinc plating baths can also be based on zinc fluoroborate.

The electrolyte further contains hydrogen ions to provide a pH on the acid side with a pH ranging from about 0 up to about 6 being typical and a pH of about 4 up to about 5.7 being preferred. The electrolyte can also contain additional additives or agents of the types conventionally employed including buffering agents and bath modifiers such as boric acid, acetic acid, benzoic acid, salicylic acid, ammonium chloride or the like. Acid chloride-type electrolytes conventionally include inert salts to increase the electrical conductivity of the electrolyte and are usually employed in amounts of about 20 up to about 450 g/l. Such inert salts conventionally comprise magnesium and alkali metal chlorides in which the term "alkali metal" is employed in its broad sense to also include ammonium chloride as well as the specific alkali metals such as sodium, potassium and lithium. Typically, the conductivity salts comprise sodium chloride or potassium chloride.

In accordance with the present invention, the acid zinc electrolyte incorporates as an essential ingredient, a carrier brightener present in a brightening amount comprising a bath-soluble low-foaming anionic sulfated polyoxyalkylene surfactant derived from the sulfation of:

(a) the polymerization of alkylene oxides selected from the group consisting of ethylene oxide, propylene oxide, glycidol, butylene oxide and mixtures thereof; and (b) the alkoxylation of mono and polyhydroxy compounds having radicals selected from the group consisting of hydroxyl containing alkyl, alkenyl, alkynyl, aryl, and carboxylic derivatives thereof as well as mixtures thereof.

The molecular weight of the carrier brightener or mixtures thereof is controlled to render the compound soluble in the electrolyte in the concentration desired. Classes of compounds encompassed within the foregoing definition include sulfated polyethers, sulfated alkoxylated acetylenic diols, sulfated ethoxylated and/or propoxylated $\alpha$- and $\beta$-naphthols, sulfated ethoxylated and/or propoxylated sorbitol and gluconates, sulfated alkoxylated fatty alcohols, and the like. Particularly satisfactory compounds comprise the mono or di-sulfated derivatives of the reaction of ethylene oxide with the acetylenic glycol, 2,4,7,9-tetra-methyl-5-decyne-4,7-diol employing from about 10 to about 30 mols ethylene oxide. It will be appreciated that the carrier brightener may contain one sulfate group on the molecule or may contain more than one sulfate group depending on the degree of sulfation and the number of reactive hydroxyl groups on the molecule.

The carrier brighteners of the present invention can be derived by the sulfation of commercially available non-sulfated nonionic surfactants such as Surfynol 465 containing 10 mols of ethylene oxide and Surfynol 485 containing 30 mols of ethylene oxide available from Air Products; the sulfation of $\beta$-naphthol-13 EO available from Heterene Chemical; the sulfation of Carbowax 3350 available from Union Carbide Corporation; the sulfation of IL-1554 and IL-1562 available from Imperial Chemical Industries. The carrier brightener is further characterized as being of relatively low-foaming properties to avoid excessive foam formation during operation of the electrolyte particularly in the presence of air agitation or severe mechanical agitation including circulation of the electrolyte by pumps.

It is further contemplated that polyethoxylated phenols can be employed having the terminal hydroxyl group sulfated. Compounds of the foregoing type which are commercially available comprise Alipal CO-436, Alipal CD-128, Alipal CO-433 available from GAF; Polystep B-20 available from Stepan, or the like. Such sulfated polyethoxylated phenols are generally less desirable because of their higher foaming characteristics but can be employed in baths which are subjected to minimal agitation to avoid excessive foaming. Other commercially available products are sulfated ethoxylated fatty alcohols, such as Lutensit AS 2230 from BASF.

The carrier brightening agent is employed in the electrolyte in an amount ranging from about 0.5 up to about 20 g/l with concentrations of from about 2.5 to about 10 g/l being preferred. The specific concentration of the carrier brightener will vary in consideration of the concentration and presence of other bath constituents, the processing parameters of the electrolyte and the type of zinc plate desired.

A particularly preferred acid zinc electrolyte in accordance with the present invention comprises an acid-chloride-type electrolyte containing from about 15 to about 53 g/l zinc ions, hydrogen ions to provide a pH of about 4 to about 5.7, conductivity salts such as sodium chloride and potassium chloride present in an amount of about 100 to about 210 g/l, a buffering agent such as boric acid present in an amount of about 15 to about 38 g/l, a carrier brightener present in an amount of about 1 to about 5 g/l selected from the group consisting of sulfated 2,4,7,9 tetra-methyl-5-decyne-4,7-diol ethoxylated with 30 mols ethylene oxide, sulfated ethoxylated/propoxylated sorbitol (M.W. 6500), sulfated ethoxylated (15 mols ethylene oxide) $\beta$-naphthol, sulfated polyethylene oxide (M.W. 6000), sulfated polyethoxylated lauryl alcohol (about 20 mols ethylene oxide), sulfated polyethoxylated phenol (about 20 mols ethylene oxide), and mixtures thereof, and, optionally, but preferably, primary and/or supplemental brightening agents of the types conventionally employed in acid zinc electrolytes in conventional amounts.

The presence of the carrier brightener provides a primary function in the electrolyte of producing grain refined deposits and allowing the primary brightener to function, secondarily, to effect an emulsification of organic soils, such as oils, which may escape past the cleaner, on the substrates being electroplated. In prior art electrolytes employing nonionic surfactant carrier brighteners, the progressive accidental introduction of organic grease and oils on the parts has occasioned an increase in the sensitivity of the electrolyte to attaining a cloud point at only moderate increases in temperature above room temperature thereby rendering the bath inoperative or less effective in achieving zinc deposits of the desired property and appearance. In addition, high electrolyte content had to be avoided even though it offered operational advantages such as increased throwing power in deep recess areas. In contrast, the anionic sulfated carrier brighteners of the present invention, provide for a substantial latitude in the operating temperature and electrolyte content enabling its use at relatively high operating temperatures such as as high as 180° F. or even higher without encountering the cloud-point phenomenon. In this way the operating temperature limit becomes the brightening ability of the primary brightener, not the solubility limit of the carrier brightener. Additionally, the sulfated anionic surfactant carrier brighteners of the present invention further enable their use under conditions when the bath is highly loaded with other ingredients, particularly metals of the Group I and II of the periodic table and also enable operation over a relatively broad range of pH. In contrast, acid zinc baths of the sulfate type generally cannot be operated employing prior art nonionic surfactant carrier brighteners at pHs substantially below about 4.

As previously mentioned, the electrolyte further contains as an optional but preferred constituent, primary and/or supplemental brightening agents to further enhance the crystal structure of the zinc electrodeposit and to provide for a broader operating average current density range. Such primary and/or supplemental brightening agents of the types well-known in the art include those disclosed in U.S. Pat. Nos. 4,170,526; 4,207,150; 4,176,017; 4,070,256 and 4,252,619. A particularly satisfactory class of such supplemental brightening agents are set forth in Table 1 of the aforementioned U.S. Pat. No. 4,252,619. The primary or supplemental brightening agents can generally be employed in amounts up to about 10 g/l with amounts as low as about 0.001 g/l being effective. Generally, concentrations of about 0.01 up to about 5 g/l are preferred.

In accordance with the process aspects of the present invention, the aqueous acid zinc electrolyte is employed for electrodepositing zinc on a conductive substrate and the electrolyte is controlled at a temperature ranging from about room temperature (60° F.) up to about 180° F. with temperatures of about 65° to about 90° F. being typical. The electrodeposition of zinc is performed at an average cathode current density generally ranging from about 1 to as high as 300 ASF depending upon the particular plating technique employed, the type and configuration of the article being plated, the specific composition of the electrolyte employed and the concentration of active constituents therein. For acid chloride-type electrolytes, operation at an average cathode current density of from about 1 to about 80 ASF is preferred while for acid sulfate-type electrolytes, average cathode current densities of about 20 up to about 300 ASF are preferred.

In order to further illustrate the improved aqueous cyanide-free zinc electrolyte of the present invention and the process for electrodepositing zinc on a conductive substrate, the following specific examples are provided. It will be appreciated that the examples are provided for illustrative purposes and are not intended to be limiting of the present invention as herein described and as set forth in the subjoined claims.

EXAMPLE 1

An aqueous acid zinc electrolyte of the chloride-type is prepared containing 60 g/l zinc chloride, 200 g/l potassium chloride, 25 g/l boric acid, 1 g/l of a sulfated carrier brightener comprising sulfated 2,4,7,9 tetra methyl 5-decyne-4 diol ethoxylated with 30 mols of ethylene oxide and hydrogen ions to provide a pH of 5.1. The electrolyte is provided with air agitation and is controlled at a temperature of about 85° F.

A cleaned, bare steel test panel is electroplated in the zinc electrolyte at an average cathode current density of 40 ASF and the test panel is observed to have a semi-bright zinc plate with good coverage in the low current density areas. A heating of the electrolyte to an elevated temperature approaching the boiling point thereof evidenced no problem of the cloud-point phenomenon.

EXAMPLE 2

An electrolyte is prepared as in Example 1 further containing 1.6 g/l sodium benzoate, 40 mg/l benzalacetone and hydrogen ions to provide a pH of 5.1

A cleaned, bare steel test panel is plated in the electrolyte at a temperature of 85° F. at an average cathode current density of 40 ASF and the plated panel is observed to have a fully bright zinc deposit over the entire surface thereof. A heating of the electrolyte to an elevated temperature did not result in any cloud-point problem.

EXAMPLE 3

An aqueous acidic zinc electrolyte of the chloride-type is prepared containing 50 g/l zinc chloride, 100 g/l ammonium chloride, 10 g/l of a carrier brightener comprising a sulfated ethoxylated β-naphthol of an average molecular weight of about 900; 15 mg/l of isopropyl nicotinate benzyl chloride quaternary and hydrogen ions to provide a pH of about 5.5.

Cleaned steel parts positioned in a rotating plating barrel are plated in the electrolyte maintained at a temperature of 80° F. at an average cathode current density of 10 ASF and the parts are observed to have a fully bright zinc deposit. A heating of the electrolyte evidenced no cloud-point problem.

EXAMPLE 4

An aqueous acidic zinc electrolyte of the chloride type is prepared containing 85 g/l zinc chloride, 125 g/l sodium chloride, 30 g/l boric acid, 2 g/l sodium benzoate, 6 mg/l butyl nicotinate dimethyl sulfate, 4.8 g/l of a carrier brightener comprising sulfated ethoxylated/-propoxylated sorbitol (M.W. 6500) and hydrogen ions to provide a pH of 5.2.

Cleaned steel parts on a supporting rack are plated in the electrolyte maintained at a temperature of 80° F. at an average current density of 35 ASF in the presence of air agitation. The parts after plating are observed to have a fully bright zinc deposit thereon. A heating of the electrolyte to an elevated temperature did not encounter any cloud-point problem.

EXAMPLE 5

An aqueous zinc electrolyte is prepared of the acid chloride-type containing 80 g/l zinc chloride, 200 g/l ammonium chloride, 3.5 g/l of a carrier brightener comprising sulfated 3,4, dimethyl 4-octyne 3,6 diol ethoxylated with 28 mols of ethylene oxide, and hydrogen ions to provide a pH of 5.2.

Cleaned steel coils of wire are immersed in the electrolyte maintained at a temperature of about 100° F. and are plated at an average cathode current density of 30 ASF. Agitation of the solution is provided by the mechanical movement of the wire coil through the electrolyte. The resultant zinc plated coils are observed to be provided with a semi-bright, smooth zinc deposit thereon. A heating of the electrolyte to an elevated temperature up to the boiling point did not encounter any cloud-point problem.

EXAMPLE 6

An aqueous acidic zinc electrolyte of the acid sulfate-type is prepared containing 250 g/l zinc sulfate, surfuric acid in an amount sufficient to provide a pH of 1.5 and 0.3 g/l of a carrier brightener comprising sulfated polypropylene glycol of an average molecular weight of about 750.

Cleaned steel strip is immersed and transferred through the electrolyte at a speed of about 300 feet per minute effecting mechanical agitation of the electrolyte and is plated at an average current density of about 120 ASF with the temperature of the electrolyte controlled at about 120° F. The resultant strip is examined and observed to have a smooth, semi-bright zinc deposit thereover of a commercially acceptable quality. A heating of the electrolyte to an elevated temperature up to the boiling point did not encounter any cloud-point problem.

While it will be apparent that the preferred embodiments of the invention disclosed as well calculated to fulfill the objects above stated, it will be appreciated that the invention is susceptible to modification, variation and change without departing from the proper scope or fair meaning of the subjoined claims.

What is claimed is:

1. An aqueous acidic zinc electrolyte containing zinc ions in an amount effective to electrodeposit zinc, hydrogen ions to provide a pH on the acid side, and a brightening amount of a carrier brightener which is a bath soluble anionic sulfated polyoxyalkylene surfactant derived from the sulfation of:

the alkoxylation of mono and polyhydroxy compounds having radicals selected from the group consisting of hydroxyl containing alkyl, alkenyl, alkynyl, aryl, and carboxylic derivatives thereof as well as mixtures thereof.

2. The electrolyte as defined in claim 1 in which said sulfated polyoxyalkylene surfactant is present in an amount of about 0.5 to about 20 g/l.

3. The electrolyte as defined in claim 1 in which said sulfated polyoxyalkylene surfactant is present in an amount of about 2.5 to about 10 g/l.

4. The electrolyte as defined in claim 1 in which said hydrogen ions are present to provide a pH of about 0 to about 6.

5. The electrolyte as defined in claim 1 in which said hydrogen ions are present to provide a pH of about 4 to about 5.7.

6. The electrolyte as defined in claim 1 in which said zinc ions are present in an amount of about 4 g/l up to saturation.

7. The electrolyte as defined in claim 1 comprising an acid-chloride type in which said zinc ions are present in an amount of about 7 to about 50 g/l.

8. The electrolyte as defined in claim 1 in which said electrolyte is of the acid-sulfate type and said zinc ions are present in an amount of about 30 to about 110 g/l.

9. The electrolyte as defined in claim 1 further including primary and/or supplemental brightening agents present in an amount up to about 10 g/l.

10. The electrolyte as defined in claim 9 in which said primary and/or supplemental brightening agents are present in an amount of at least about 0.001 g/l.

11. The electrolyte as defined in claim 1 further including primary and/or supplemental brightening agents present in an amount of about 0.01 to about 5 g/l.

12. The electrolyte as defined in claim 1 further including conductivity salts present in an amount up to about 450 g/l.

13. The electrolyte as defined in claim 1 in which said electrolyte is of the acid chloride-type in which said zinc ions are present in an amount of about 15 to about 53 g/l, said hydrogen ions are present to provide a pH of about 4 to about 5.7, said electrolyte further containing conductivity salts present in an amount of about 100 to about 210 g/l, said electrolyte further containing a buffering agent present in an amount of about 15 to about 38 g/l, said sulfated polyoxyalkylene surfactant present in an amount of about 1 to about 5 g/l comprising a compound selected from the group consisting of sulfated 2,4,7,9 tetra-methyl-5-decyne-4,7-diol ethoxylated with 30 mols ethylene oxide, sulfated ethoxylated/propoxylated sorbitol (M.W. 6500), sulfated ethoxylated (15 mols ethylene oxide) $\beta$-naphthol, sulfated polyethoxylated lauryl alcohol (about 20 mols ethylene oxide), sulfated polyethoxylated phenol (about 20 mols ethylene oxide), and mixtures thereof.

14. A process for electrodepositing zinc on a conductive substrate which comprises the steps of contacting a substrate with the aqueous acidic zinc electrolyte as defined in claim 1 and electrodepositing zinc on the substrate to a desired thickness.

15. A process as defined in claim 14 including the further step of controlling the temperature of the electrolyte within a range of about 60° to about 180° F.

16. The process as defined in claim 14 including the further step of controlling the temperature of said electrolyte within a range of about 65° to about 90° F.

17. The process as defined in claim 14 including the further step of controlling the average cathode current density during the step of electrodepositing zinc on the substrate within a range of about 1 to about 300 ASF.

18. The process as defined in claim 14 in which said electrolyte is of the acid chloride-type including the further step of controlling the average cathode current density during the step of electrodepositing zinc on the substrate within a range of about 1 to about 80 ASF.

19. The process as defined in claim 14 in which said electrolyte is of the acid sulfate-type including the further step of controlling the average cathode current density during the step of electrodepositing zinc on the substrate within a range of about 20 to about 300 ASF.

* * * * *

UNITED STATES PATENT AND TRADEMARK OFFICE

Certificate

Patent No. 4,541,906                  Patented September 17, 1985

On petition requesting issuance of a certificate of correction of inventorship pursuant to 35 USC 256, it has been found that the above-identified patent, through error and without any deceptive intent, improperly sets forth the inventorship. Accordingly, it is hereby certified that the correct inventorship of this patent is Sylvia Martin and Randal D. King.

Signed and Sealed this sixth Day of May 1986.

BRADLEY R. GARRIS,
*Office of the Deputy Assistant Commissioner for Patents.*